Nov. 10, 1970  G. B. DUPONT, SR  3,538,525
METHOD AND APPARATUS FOR FORMING THREADS ON STUDS
Filed July 29, 1965  3 Sheets-Sheet 1
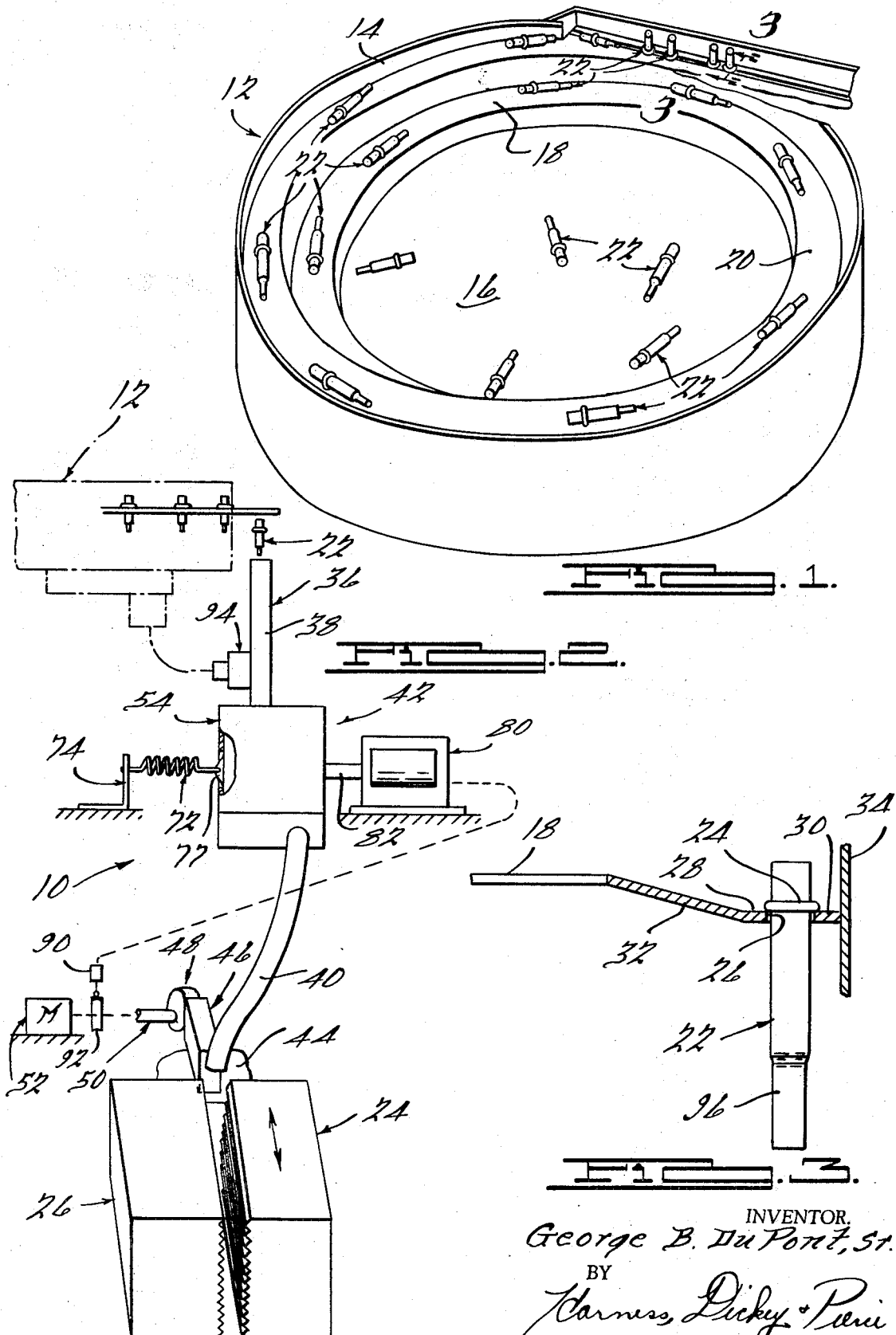
INVENTOR.
George B. DuPont, Sr.
BY
Harness, Dickey & Pierce
ATTORNEYS.

Nov. 10, 1970  G. B. DUPONT, SR  3,538,525
METHOD AND APPARATUS FOR FORMING THREADS ON STUDS
Filed July 29, 1965  3 Sheets-Sheet 2
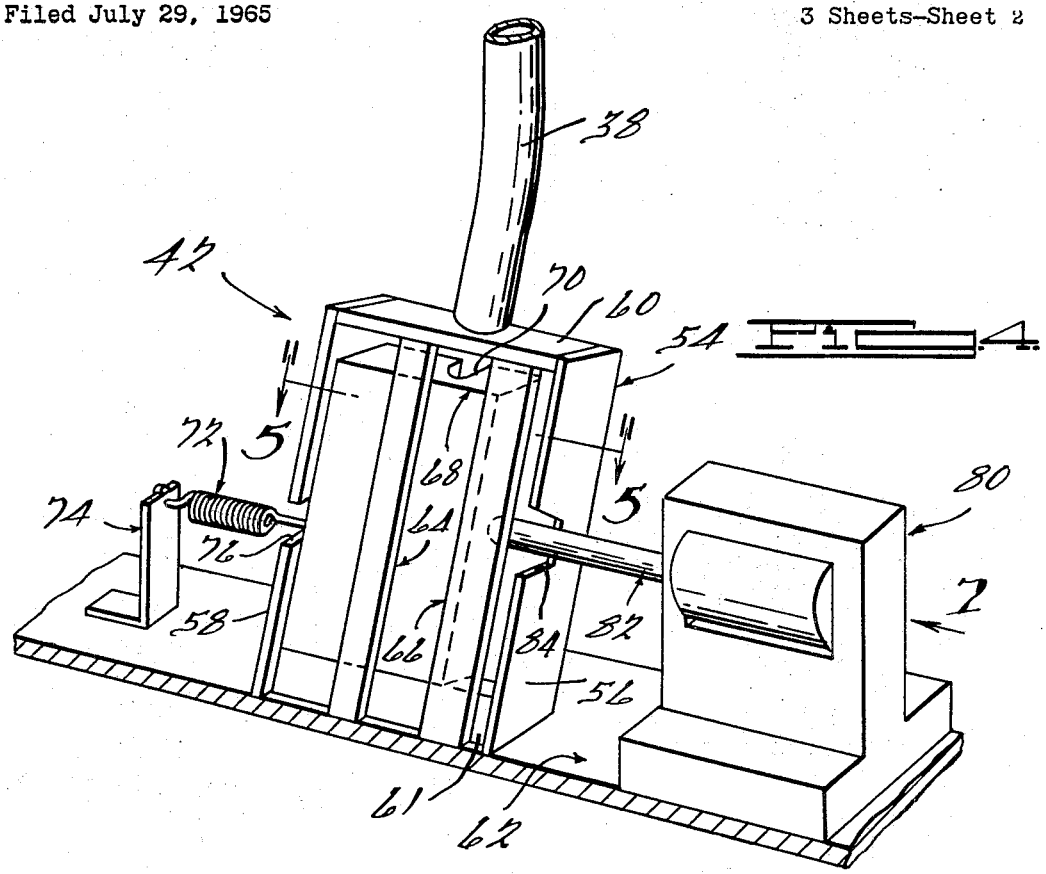
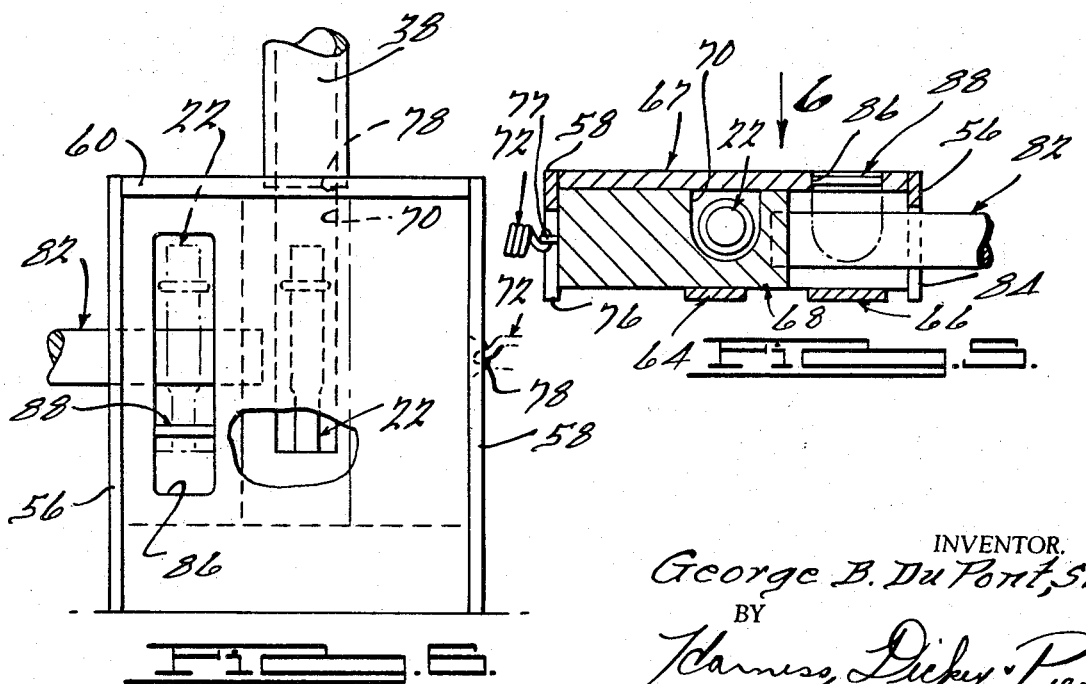
INVENTOR.
George B. DuPont, Sr.
BY
Harness, Dickey & Pierce
ATTORNEYS

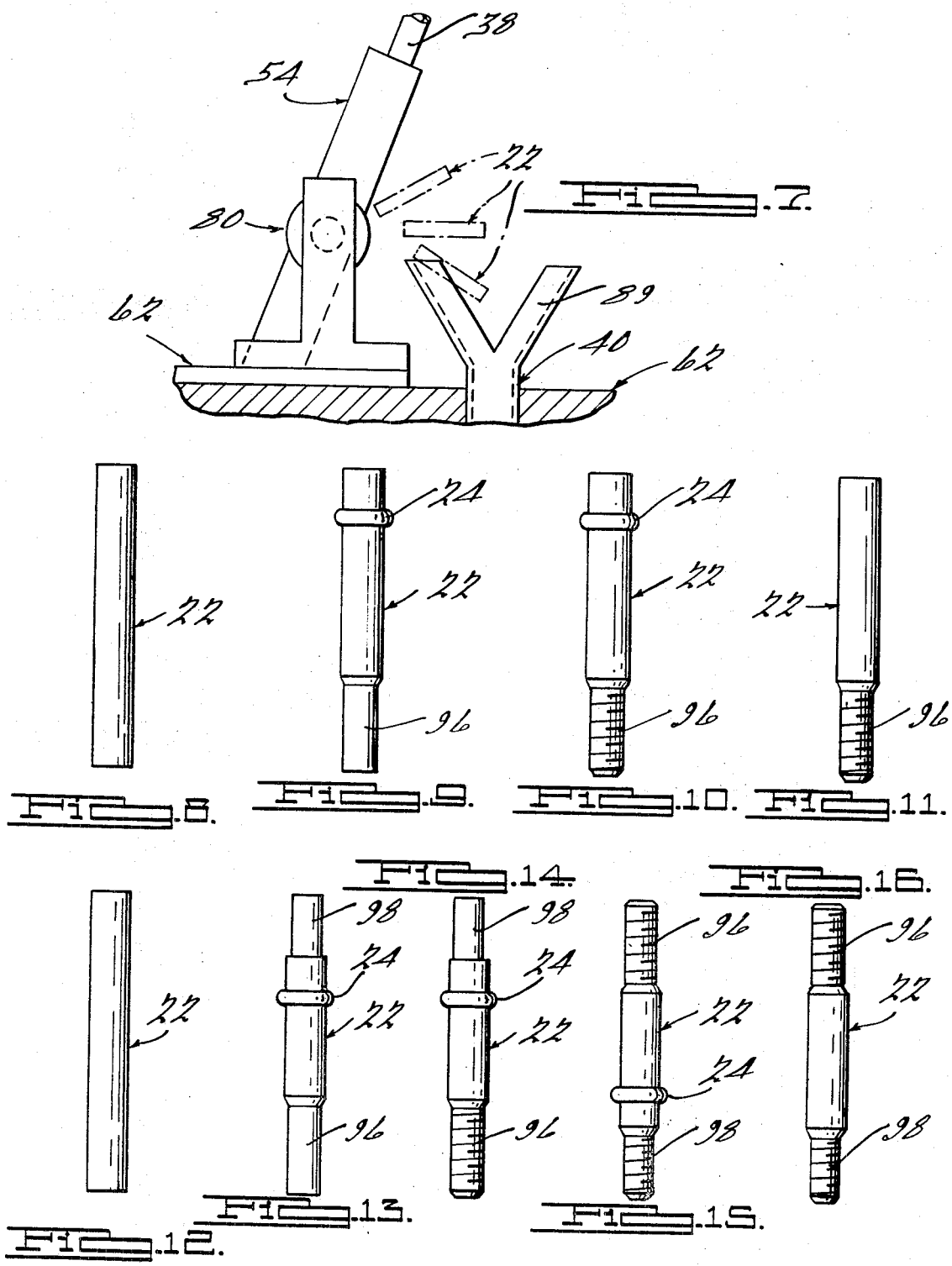

United States Patent Office 3,538,525
Patented Nov. 10, 1970

3,538,525
METHOD AND APPARATUS FOR FORMING THREADS ON STUDS
George B. Dupont, Sr., Royal Oak, Mich., assignor to G. B. Dupont Co., Inc., Troy, Mich., a corporation of Michigan
Filed July 29, 1965, Ser. No. 475,664
Int. Cl. B23g 1/00
U.S. Cl. 10—11                                    6 Claims

ABSTRACT OF THE DISCLOSURE

In an apparatus for successively forming preselected portions of a plurality of workpieces, means defining a workpiece container, means for successively dispensing workpieces from the container in a preselected orientation, means for forming the preselected portion of each of the workpieces, a workpiece inverting mechanism, means for conveying the workpieces from the dispensing means to the inverting mechanism while maintaining the workpieces in the preselected orientation, the mechanism comprising housing means and shuttle means movable between first and second spaced positions within the housing means, means for conveying successive workpieces from the shuttle means when the shuttle means is disposed in the second position, and means for selectively biasing the shuttle means between the first and second positions.

---

This invention relates generally to work stock handling and forming apparatus and, more particularly, to a new and improved method and apparatus for feeding successive workpieces to a thread forming device and subsequently forming threads on the workpieces.

It has heretofore been the practice in forming helical and similar type threads on the ends of cylindrical workpieces, such as studs and the like, to manually feed the individual studs into a thread forming apparatus to assure that the studs will be properly oriented with respect to the thread forming dies. This procedure, of course, has been objectionable due to the resulting relatively high labor costs involved. Broadly speaking, the present invention is directed toward a new and improved method and apparatus for automatically feeding successive studs and similar type workpieces to a thread forming apparatus in a manner such that each individual workpiece is oriented in a predetermined manner, thereby obviating the above and other objectionable features of the theretofore known and followed practice of feeding individual workpieces into the forming machine by hand.

It is accordingly a general object of the present invention to provide a novel method and apparatus for automatically feeding successive workpieces into a thread forming machine or the like.

It is another object of the present invention to provide a novel method and apparatus of the above character which is adapted to feed successive workpieces into a thread forming machine in a manner such that the same end of each workpiece is subjected to the action of the thread forming dies.

It is a more particular object of the present invention to provide a novel method and apparatus of the above character which normally feeds the same end of each workpiece into the thread forming apparatus, but which may be provided with means for inverting or up-ending each workpiece before it is fed to the thread forming apparatus so that the opposite ends thereof may be subjected to the action of the forming dies.

It is still another object of the present invention to provide a novel method and apparatus of the above character which is adapted to accommodate workpieces of various sizes and configurations and is thus characterized by universality of application.

It is yet another object of the present invention to provide a novel apparatus of the above character which is characterized by constructional and operational simplicity.

It is yet a further object of the present invention to provide a new and improved apparatus of the above character of an extremely simple and compact design which is easily to assemble and economical to commercially manufacture.

Other objects and advantages of the present invention will become apparent from the following detailed description taken in conjunction with the accompanying drawings, wherein:

FIG. 1 is an elevated perspective view of a portion of the workpiece feeding apparatus of the present invention;

FIG. 2 is an elevated perspective view, partially schematic, of another portion of the workpiece feeding apparatus of the present invention, as seen in operative association with a pair of thread forming dies;

FIG. 3 is an enlarged cross sectional view taken substantially along the line 3—3 of FIG. 1;

FIG. 4 is an enlarged elevated perspective view of the workpiece inverting mechanism shown in FIG. 2;

FIG. 5 is a transverse cross-sectional view taken along the line 5—5 of FIG. 4;

FIG. 6 is a transverse cross-sectional view, partially broken away, of the structure illustrated in FIG. 5, as seen in the direction of the arrow 6 therein;

FIG. 7 is a side elevational view of the structure illustrated in FIG. 4, as seen in the direction of the arrow 7 therein;

FIG. 8 is a side elevational view of a typical workpiece which the apparatus for the present invention is adapted to accommodate;

FIG. 9 is a side elevational view of the workpiece illustrated in FIG. 8 after it has been subjected to an initial sizing operation preparatory to threads being formed on one end thereof;

FIG. 10 is a side elevational view of the workpiece illustrated in FIG. 9 after it has been subjected to the action of a pair of thread forming dies;

FIG. 11 is a side elevational view of the workpiece illustrated in FIG. 10 in a completely finished condition;

FIG. 12 is a side elevational view of another typical workpiece which the apparatus of the present invention is adapted to accommodate;

FIG. 13 is a side elevational view of the workpiece illustrated in FIG. 12 after it has been subjected to an initial sizing operation preparatory to threads being formed on both ends thereof;

FIG. 14 is a side elevational view of the workpiece illustrated in FIG. 13 after the lower end thereof has been subjected to the action of a pair of thread forming dies;

FIG. 15 is a side elevational view of the workpiece illustrated in FIG. 14 after it has been inverted and had the opposite end thereof subjected to the action of a pair of thread forming dies; and FIG. 16 is a side elevational view of the workpiece illustrated in FIG. 15 in a completely finished condition.

In general, the present invention is directed toward an apparatus for forming threads on workpieces such as cylindrical studs or the like and comprises a vibrating or oscillating workpiece feeding device which conveys successive workpieces to a pair of spaced parallel tracks. In accordance with the principles of the present invention, prior to the thread forming operation, each of the workpieces is formed with an outwardly projecting shoulder portion whereby the workpieces may be supported between the aforesaid tracks in a manner such that each workpiece has the same end portion depending downwardly therefrom so that all of the workpieces are uniformly oriented. The workpieces are conveyed along the tracks to a feed tube which communicates the workpieces in their pre-oriented positions to a pair of thread forming dies which are adapted to form threads on the lower end of each of the workpieces in a conventional manner. Means in the form of a workpiece inverted may be provided to invert or up-end each of the workpieces prior to it being delivered to the dies when it is desired to have threads formed on the upper ends of the workpieces which are normally not subjected to the action of the forming dies. After the threads have been thus formed, the shoulder portions may be removed from the workpieces by conventional grinding techniques preparatory to or during final finishing of the workpieces.

Referring now to FIGS. 1 through 3 of the drawings, an apparatus for forming threads on successive workpieces as they are individually fed threreto, generally designated by the numeral 10 and constructed in accordance with an exemplary embodiment of the present invention, is shown as comprising a generally circular vibrating or oscillating tray assembly 12 which includes an annular upwardly projecting side wall section 14, a substantially flat central or bottom section 16, and a helical or spiral shaped feed section 18 that extends from a position adjacent the bottom section 16 around the inner periphery of the side wall section 14 and terminates at its upper end adjacent the upper edge of the side wall section 14. The feed section 18 defines a helical or convolute path 20 which extends approximately one-and-one-half revolutions around the inner periphery of the side wall section 14. The construction and operation of the tray assembly 12 per se does not constitute a material part of the present invention and therefore will be described in no greater detail other than that upon energization thereof, a predetermined vibratory movement is imparted to the portions 16 and 18, whereby the workpieces, a plurality of which are illustrated in FIG. 1 and generally designated by the numeral 22, are conveyed from the bottom section 16 to the lower end of the feed section 18, and thereafter are conveyed along the helical path 20 defined by the feed section 18 to a position adjacent the upper edge of the side wall section 14. From this position, the workpieces 22, which are preferably in the form of elongated cylindrical studs or the like, are conveyed to a pair of thread forming dies illustrated in FIG. 2 and designated by the numerals 24 and 26, at which time predetermined end portions of each of the studs 22 are subjected to a thread forming operation, as will later be described.

In accordance with the principles of the present invention, prior to the plurality of studs 22 being placed within the assembly 12, each of the studs 22 is formed with a radially outwardly projecting shoulder portion 24 which preferably extends entirely around the outer periphery thereof. As best seen in FIG. 9, the shoulder portions 24 may be formed on the studs 22 at the same time one end thereof is necked down or swaged to a predetermined diameter which is ultimately the outside thread diameter. This operation may be accomplished on any one of a number of well known types of apparatus, for example, a rolling mill or the like. In the event it is desired to form threads on both ends of the studs 22, each end thereof may be reduced in diameter at the same time the shoulder portions 24 are formed thereon, as illustrated in FIG. 13.

As best seen in FIG. 3, the shoulder portions 24 function to support the studs 22 within an elongated channel or slot 26 that extends substantially tangentially to the tray assembly 12 adjacent the upper end of the feed section 18 thereof. The channel 26 is defined by a pair of parallel tracks 28 and 30 which are spaced apart a distance sufficient to permit the studs 22 to drop downwardly therebetween, yet are close enough such that the shoulder portions 24 will engage the upper edges of the tracks 28, 30 to prevent the studs 22 from dropping completely through the channel 26. As see in FIG. 3, the tracks 28, 30 are disposed slightly below the upper end of the helical section 18 of the assembly 12, the track 28 being supported on the section 18 by a downwarly inclined ramp portion 32, while the track 30 is supported by a vertically extending and tangentially oriented side wall 34. Upon energization of the assembly 12, the studs 22 will ride up the helical path 20 defined by the feed section 18 until the studs 22 reach the upper end of the path 20, at which time the studs 22 will roll downwardly toward the channel 26 along the ramp portion 32 under the influence of gravity and the vibrating action of the assembly 12. When the studs 22 reach the channel 26, one end of each of the studs 22 will drop downwardly between the tracks 28, 30, the shoulder portions 24 preventing the studs 22 from dropping entirely through the channels 26, as above described. Once the studs 22 are oriented in the position illustrated in FIG. 9, they will move longitudinally along the channel 26 toward the outer ends of the tracks 28 and 30 under the influence of the vibrating movement imparted to the tracks 28, 30 by the assembly 12.

As best seen in FIG. 9, the shoulder portions 24 are formed on the studs 22 on the ends opposite those which are to have threads formed thereon, the reason for this being that when the studs 22 are supported by the shoulder portions 24 in the manner illustrated in FIG. 3, the ends of the studs 22 which are to have the threads formed thereon will always depend downwardly below the tracks 28, 30 by virtue of the fact that the center of gravity of the studs 22 is located below the shoulder portions 24. Accordingly, as the studs 22 roll down the ramp portion 32 onto the tracks 28, 30, the same end of each of the studs 22 will extend downwardly below the channel 26. As seen in FIG. 13, in the event that threads are to be formed on each end of the studs 22, the shoulder portions 24 are still formed at a position away from the longitudinal center of the studs 22, whereby the same end of each of the studs will depend downwardly within the channel 26, as above described. If it is desired to form threads on the ends of the studs 22 which extend upwardly from the tracks 28, 30, the studs are conveyed to an inverter mechanism, later to be described, which inverts or up-ends each of the studs such that the ends thereof which project above the tracks 28, 30 are fed to the thread forming dies 24, 26.

Located directly below the outer end of the channel 26 is a verticaly extending conveying or feed tube 36 which comprises upper and lower sections 38 and 40, respectively. As the successive studs 22 reach the outer ends of the tracks 28 and 30, they drop downwardly into the tube 36 and are transferred or conveyed thereby to a position interjacent the thread forming dies 24 and 26. It will be seen that since each of the studs 22 is oriented with the end to have threads formed thereon disposed below the tracks 28 and 30, the studs 22 will be delivered to the dies 24, 26 with these ends projecting downwardly. In the embodiment of the present invention illustrated herein, the upper section 38 of the tube 36 is adapted to convey the studs 22 to an inverting mechanism 42 which functions to invert or up-end each of the studs 22 prior to the studs being transferred to the lower section 40 of the tube 36, the mechanism 42 being used where it is desired to form threads on the ends of the studs 22 which project above the tracks 28 and 30, as will later be described. It will be apparent, of course, that when it is desired to only form threads on the lower ends of the studs 22, the upper and lower sections 38 and 40 of the tube 36 are integrally connected and are in effect a single tube, whereby the studs 22 will be delivered to the dies 24 and 26 in the same uniform orientation as they drop off the ends of the tracks 28 and 30.

The lower end of the tube section 40 terminates directly above a substantially horizontally extending support surface 44 that is spaced below the lower end of the section 40 a distance slightly greater than the length of the studs 22 and against which the lower ends of the studs 22 are supported as they are conveyed to the does 24, 26. A stud feeding pusher or finger member 46 is located on the opposite side of the tube section 40 from the dies 24 and 26, the finger 46 along with the lower end of the tube section 40 being longitudinally aligned with the stud receiving cavity or throat defined between the working faces of the dies 24 and 26. The finger 46 is reciprocable toward and away from the dies 24 and 26 for feeding the successive studs 22 to a position interjacent the dies 24 and 26 as they drop out of the lower end of the tube section 40. The finger 46 is biased toward and away from the dies 24, 26 by a rotatably mounted cam member 48 which selectively engages the rear face of the finger 46, as seen in FIG. 2. The cam 48 is mounted on a suitable shaft 50 which is rotated upon energization of an associated drive motor, schematically illustrated herein and designated by the numeral 52. The motor 52 is suitably timed or is provided with appropriate gearing such that the cam 48 will complete one revolution with each operational cycle of the thread forming dies 24 and 26. Hence, as the individual studs 22 drop downwardly onto the surface 44, the feed finger 46 biases them forwardly to a position interjacent to the dies 24 and 26 upon rotation of the cam 48, at which time one or both of the dies 24, 26 reciprocates in the conventionad manner to form the threads on the lower end of the studs 22. After the threads have been thus formed on the studs 22, they will drop downwardly between the dies 24, 26 to a tote box or similar type receptacle located therebelow. It may be noted that as the feed finger 46 moves forward to a position feeding a stud member 22 between the dies 24, 26, the upper surface of the finger 46 serves as a stop means to prevent the next successive stud member 22 from dropping onto the support surface 44 until the finger 46 is in its retracted position.

Referring now in detail to the construction and operation of the workpiece inverting mechanism 42, as best seen in FIGS. 4, through 6, the mechanism 42 comprises a generally rectangular shaped housing 54 which consists of spaced parallel side walls 56 and 58, an upper wall or top 60 and base section 61 which respectively extend between the upper and lower ends of the side walls 56 and 58. The base section 61 is rigidly secured to a suitable support platform 62. A pair of upwardly extending spaced retainer plate 64 and 66 extend between the top 60 and base section 61 at the rear side of the housing 54 and a closure plate 67 covers the opposite side of the housing 54, as illustrated in FIG. 5. As best seen in FIG. 7, the housing 54 is inclined at a predetermined angle from vertical for reasons to be later described.

Disposed within the housing 54 is a horizontally movable shuttle member, generally designated by the numeral 68, that is generally rectangular in shape and is formed with a semicircular shaped recess 70 on the side thereof facing away from the retainer plates 64, 66. The recess 70 extends downwardly from the upper end of the member 68 a distance somewhat greater than the lengths of the studs 22, as best seen in FIG. 6. The shuttle member 68 is spring-biased to a position adjacent the side wall 58 of the housing 54 by means of a resilient spring member 72 which is supported at one end by a suitable bracket 74 fastened to the support structure 62. The opposite end of the spring 72 extends through a recess 76 in the side wall 58 and is connected to a boss portion 77 formed on the adjacent side of the shuttle member 68, as seen in FIG. 2.

As best seen in FIG. 6, when the shuttle member is spring-biased to the position adjacent the side wall 58, the upper end of the recess 70 is aligned with or registers with an opening 78 formed in the top 60 of the housing 54, which opening 78 has the lower end of the feed tube section 38 recessed therewithin, whereby the stud members 22 which drop downwardly within the tube section 38 will pass through the opening 78 and drop into the recess 70, the closure plate 67 serving to retain the individual stud members 22 within the recess 70, as seen in FIG. 5.

Mounted on the support structure 62 adjacent the side wall 56 of the housing 54 is a solenoid type actuating mechanism, generally designated 80, which includes actuating or control rod 82. The mechanism 80 is of conventional design and upon appropriate energization thereof, the rod 82 will move axially toward the mechanism 80. The end of the rod 82 opposite that which is connected to the mechanism 80 extends through a recess 84 formed in the side wall 56 of the housing 54 and is rigidly connected to the side of the shuttle member 68 which confronts the inner side of the wall 56. Accordingly, upon energization of the mechanism 80, the shuttle member will move from the position indicated by solid lines in FIG. 5 to the position indicated by the phantom lines in this figure, and upon deenergization of the mechanism 80, the spring 72 will function to resiliently bias the shuttle member 68 back to the position illustrated by the solid lines in FIG. 5. As best seen in FIGS. 5 and 6, a rectangular shaped discharge opening 86 is formed in the closure plate 67 at a position which is aligned with the recess 70 when the shuttle member 68 is biased to the position indicated by the phantom lines in FIG. 5. A generally horizontally extending tripping bar 88 extends across the lower end of the opening 86 and functions to invert or up-end the stud members 82 as they are discharged through the opening 86. As best seen in FIG. 7, the upper end of the tube section 40 is formed with a generally bifurcated portion 89 that is aligned with the discharge opening 86 and which is adapted to receive the successive stud members 22 as they are discharged through the opening 86, as illustrated by the phantom lines in FIG. 7 and in a manner later to be described.

Means in the form of a magnetic sensor 94 is provided adjacent the upper tube section 38 and is connected to the means, i.e., electric motor or the like, for energizing the feed tray assembly 12. The senser 94 is adapted to detect the presence of a preselected number of stud members 22 within the tube section 38 and function to deenergize the aforesaid means for actuating the assembly 12 until such time as the number of stud members 22 within the tube section 38 is less than a predetermined amount, thereby preventing overloading of the tube section 38, as will be apparent.

To facilitate correlating the various hereinbefore specifically described component members of the apparatus 10 of the present invention, a brief description of an exemplary operational cycle thereof will now be given.

Initially, a plurality of stud blanks, one of which is illustrated in FIG. 8, and in FIG. 12, are subjected to a forming or sizing operation wherein the shoulder portions 24 along with one reduced diameter end portion 96 is formed thereon, as seen in FIG. 9. In the event threads are to be formed on both ends of the stud blanks, reduced diameter end portion 98 may be formed on the blanks at the same time the portions 24 and 96 are formed, as seen in FIG. 13. After the studs 22 have thus been formed, they are placed within the tray assembly 12 in any random orientation. Thereafter, the assembly 12 is energized, whereby the studs 22 are fed along the helical path 20 defined by the feed section 18. As the studs 22 reach the upper end of the section 18, they roll downwardly along the ramp portion 32 and, by virtue of the off center location of the shoulder portions 24 formed thereon, the ends of the studs 22 upon which the portions 96 are formed will drop downwardly through the channel 26 defined by the tracks 28 and 30, as above described. The plurality of studs 22 then move axially along the tracks 28, 30 and drop singularly downwardly off from the outer ends thereof into the upper section 38 of the feed tube 36. Assuming that the stud members 22 illustrated in FIG. 9 are being handled by the apparatus 10 and that the inverter mechanism 42 is not being used, the stud members 22 will drop downwardly through the feed tube 36 in the same orientation in which they were supported upon the tracks 28, 30, i.e., with the end portions 96 directed downwardly. The stud members 22 will drop downwardly through the tube 36 and successively engage the support surface 44 adjacent the dies 24, 26. At a predetermined time, the feed finger 46 will bias the studs 22 to a position interjacent the dies 24, 26, as above described, whereby threads will be formed on the end sections 96 of the stud members 22.

In the event threads are to be formed on both ends of the stud blanks, stud members such as the one illustrated in FIG. 13 are used, i.e., stud members which have reduced diameter end portions 96 and 98. In this case, the threads are formed on the end sections 96 of the stud blanks in the manner above described, whereby the blanks will appear as illustrated in FIG. 14. These stud blanks with the threads formed on the end portion 96 thereof are placed within the tray assembly 12 of the apparatus 10 which is provided with the inverting mechanism 42. Assuming that the stud members 22 are conveyed to the upper end of the feed tube 36 in the above described manner, and assuming that the solenoid mechanism 80 has not been energized, the first stud member 22 that drops downward through the tube section 38 falls under the influence of gravity into the recess 70 of the shuttle member 68 with the end portion 96 directed downward. As the shaft 50 turns due to energization of the drive motor 52, the cam member 48 will actuate the switch 90, resulting in the solenoid mechanism 80 being energized. At this time, the shuttle member 68 will be biased from the position indicated by the solid lines in FIG. 5 due to axial movement of the rod 82 toward the mechanism 80. When the shuttle member 68 is biased to the position indicated by the phantom lines in FIG. 5, the stud member 22 which is nested within the recess 70 will fall through the discharge opening 86 in the housing 54 by virtue of the inclination of the housing 54, as indicated in FIG. 7. As the stud member 22 falls out of the opening 86, the end portion 96 thereof will engage the tripping bar 88 such that the stud 22 will be up-ended or turned end-for-end. Accordingly, the upper end, i.e., the end portion 98, of the stud 22 will fall first into the bifurcated portion 89 of the tube section 40. It may be noted that as the shuttle member moves to the position where the recess 70 registers with the discharge opening 86, a sufficient portion of the shuttle member 68 remains aligned with the opening 78, whereby to prevent the next successive stud member 22 within the tube section 38 from dropping downwardly into the housing 54. After the stud member 22 has been discharged through the opening 86, the solenoid mechanism 80 will be deenergized by deactuation of the switch 90, at which time the spring 72 will resiliently bias the shuttle member 68 back to the position indicated by the solid lines in FIG. 5 to permit the next successive stud member 22 within the tube section 38 to drop downwardly into the recess 70. The stud members 22 which are inverted by the mechanism 42 drop downwardly through the lower tube section 40 until the end portions 98 thereof engage the support surface 44 at a position aligned with the channel defined between the thread forming dies 24 and 26. The cam member 48 which is rotatably mounted upon the shaft 50 will, at a predetermined time in the cyclic operation of the apparatus 10, bias the feed finger 46 toward the forming dies 24, 26, thereby moving the individual stud members 22 supported upon the surface 44 to a position interjacent the dies 24 and 26 so that threads may be formed on the reduced diameter sections 98 thereof, resulting in the stud members 22 appearing as in FIG. 15.

After the threads have been formed on the stud members 22, the portions 24 thereof may be removed by any suitable technique such as grinding or the like preparatory to or during the final finishing of the stud members 22 which results in the members 22 appearing as illustrated in FIGS. 11 and 16.

It will be seen from the foregoing description that the present invention provides a novel method and apparatus for forming the threads on work stock such as the studs 22, which apparatus is extremely simple in operation and construction and is therefore economical to commercially manufacture. A particular feature of the present invention resides in the fact that the apparatus 10 is adapted to accommodate workpieces of various sizes and configurations and is thus characterized by universality of application. Another feature of the present invention will be seen from the fact that the apparatus is entirely automatic in operation and thereby minimizes associated labor costs to a minimum.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

What is claimed is:

1. In an apparatus for forming threads on one end of a plurality of workpieces each of which includes an outwardly projecting shoulder portion, a workpiece container, a pair of spaced parallel tracks engageable with the shoulder portions on each of said workpieces whereby to uniformly orient the workpieces, means for conveying the workpieces from said container to said tracks, a workpiece conveying tube for conveying the workpieces from said tracks while maintaining the orientation of the workpieces which they assumed when supported on the tracks, a pair of thread forming dies adjacent one end of the tube, means for selectively feeding the workpieces from said tube to said dies, and means for inverting all of the workpieces from the orientation which they assumed when supported on said tracks prior to the workpieces being conveyed to said feeding means, said inverting means comprising a housing in which the workpieces are successively received, said housing being inclined from the vertical, a workpiece discharge opening on the downwardly facing side of said housing, and means selectively releasing said workpieces to fall by gravity from said opening.

2. The invention as set forth in claim 1, said last-mentioned means comprising a shuttle member movable between a first position receiving each workpiece from said tube and a second position permitting release of said workpiece through said opening.

3. In an apparatus for forming threads on one end of a plurality of workpieces each having an outwardly projecting shoulder portion adjacent one end thereof.

a vibrating workpiece feeding tray defining a helical feed path, a pair of spaced parallel workpiece feeding tracks adjacent the upper end and extending substantially tangential to said path for conveying workpieces from said tray, said track being adapted to engage the shoulder portions of the workpieces and defining an elongated channel therebetween adapted to receive one end of each of the workpieces, a pair of thread forming dies, a workpiece inverting mechanism, a substantially hollow workpiece conveying tube disposed below said tracks for succesively conveying the workpieces supported on said tracks to said mechanism, said mechanism comprising a generally rectangular shaped housing having a shuttle member movably mounted therewithin, said shuttle member having a workpiece receiving recess formed in one side thereof, a first opening in said housing for communicating workpieces to said recess in said shuttle member, a second opening in said housing permitting workpieces to be discharged from said recess under the influence of gravity, means for preventing workpieces from passing through said first opening when said shuttle member is adjacent said second opening, means for selectively biasing said shuttle member between said first and second openings, a workpiece feeding finger adjacent said dies, cam means for moving said finger to and from a position feeding workpieces from said tube to said dies, and means for selectively rotating said cam means.

4. In an apparatus for forming threads on one end of a plurality of workpieces each of which includes an outwardly projecting shoulder portion formed at one end thereof, an energizable tray assembly comprising a bottom portion, a side wall portion and a feed portion defining a helical feed path from said bottom portion to the top of said side wall portion, a pair of spaced parallel work feeding tracks extending tangentially to said side wall portion adjacent the upper end of said feed portion, said tracks defining an elongated channel therebetween which is sufficiently large to permit one end portion of each of said workpieces to drop downwardly therewithin but which is small enough to prevent the shoulder portion of each of said workpieces from dropping downwardly therewithin, a first substantially hollow workpiece conveying tube having one end thereof disposed adjacent the outer ends of said tracks and adapted to have the workpieces drop downwardly therewithin as they are conveyed thereto, a rectangularly shaped housing inclined at a preselected angle from vertical, a shuttle member movable between two spaced positions in said housing, said shuttle member having an upwardly extending workpiece conveying recess formed therein, said recess being substantially the same length as the workpieces, a first opening in the top of said housing communicable with said recess when said shuttle member is disposed in one of said positions for communicating workpieces to the recess, said first opening being communicable with the lower end of said first tube whereby workpieces may drop from said tube into said recess, a second opening in the side of said housing communicable with said recess when said shuttle member is disposed in one of said positions for discharging workpieces from said recess, a tripping bar extending across a portion of said second opening for up-ending the workpieces as they are discharged through said second opening, means for biasing said shuttle member from one of said positions to the other of said positions, spring means for biasing said shuttle member from one of said positions to the other of said positions, a pair of thread forming dies disposed adjacent the lower end of said tube, a second substantially hollow workpiece conveying tube for communicating workpieces from said second opening to said dies, a workpiece feeding finger reciprocably mounted adjacent said dies and adapted to bias workpieces conveyed through said second tube to a position between said dies, and means including cam means for selectively reciprocating said finger.

5. The invention as set forth in claim 4 which includes means for deenergizing said tray assembly in response to the quantity of workpieces in one of said tubes.

6. The invention as set forth in claim 4 which includes means cooperable with said cam means for reciprocating said finger.

References Cited

UNITED STATES PATENTS

| | | | |
|---|---|---|---|
| 1,615,137 | 1/1927 | Ruby | 10—162 |
| 1,966,056 | 7/1934 | Wilcox et al. | 10—165 XR |
| 2,020,659 | 11/1935 | Frost | 72—90 |
| 2,662,626 | 12/1953 | Graham et al. | 10—162 |
| 2,872,019 | 2/1959 | Owen | 198—33 |
| 1,110,762 | 9/1914 | Ferry | 10—11 XR |

LEONIDAS VLACHOS, Primary Examiner

U.S. Cl. X.R.

10—27; 29—190; 72—88; 198—24; 214—1